UNITED STATES PATENT OFFICE.

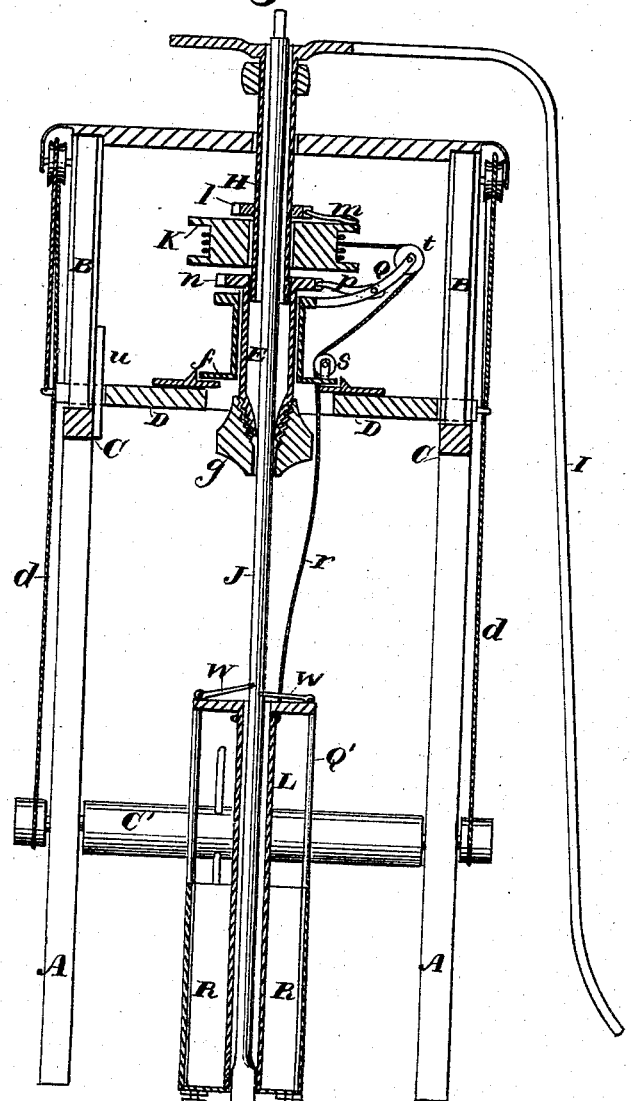

ELLERY M. HOAGLAND, OF WATSONVILLE, CALIFORNIA.

IMPROVEMENT IN MACHINES FOR OPERATING EARTH-AUGERS.

Specification forming part of Letters Patent No. 182,827, dated October 3, 1876; application filed August 24, 1876.

*To all whom it may concern:*

Be it known that I, ELLERY M. HOAGLAND, of Watsonville, county of Santa Cruz and State of California, have invented an Improved Machine for Operating Earth-Augers; and I do hereby declare the following to be a full, clear, and exact description thereof, reference being had to the accompanying drawing.

My invention relates to an improved machine for handling and operating earth-boring augers for boring wells and other holes in the ground.

Referring to the accompanying drawings, in which Figure 1 is a sectional elevation, let A represent a portable frame, which can be placed directly over the place where the well or hole is to be bored. B B are two upright timbers, which extend downward from the middle of the upper timber of the frame A, on opposite sides, and may either extend down to the ground timber or to a cross-beam, c, as desired. D is a sliding platform or cross-head, which extends across the two upright posts or timbers B B, inside of the frame A, and is guided by them. This platform is arranged to be raised or lowered by means of a windlass, C', which is placed within reach of the operator, a cord, d, connecting the windlass and platform.

A short tube, E, is placed vertically in a hole in the middle of the platform, and is supported by a flange, f, which rests upon a plate secured upon the platform. The lower end of this short tube is made conical, and is provided with screw-threads. This threaded portion is then split in two or more places, and a nut, g, screws upon it, for the purpose hereinafter described. Another tube, H, passes down through the upper platform of the frame end, and its lower end enters the upper end of the short tube E. This latter tube is the driving-shaft, and the sweep I is secured to its upper end; or other power may be applied, as desired. The drill-rod J passes down through these tubes, and is secured in the desired position by turning the nut g upon the conical split end of the tube E, so as to close the end of the tube upon the rod and hold it in place.

A horizontal drum or pulley, k, is placed loosely upon the tube H. A toothed wheel, l, is secured to the tube, just above the pulley; and a lever-pawl, m, is secured to the pulley, so that it can be engaged with the toothed wheel, and thus cause the drum to rotate with the tube.

A ratchet-wheel, n, is secured to the lower end of the tube H, below the pulley or drum, and an arm, Q, is secured to the upper end of the lower tube E, as represented. This arm extends out beyond the periphery of the drum, and it has a pawl, p, arranged to engage with the ratchet-wheel m.

The earth-auger Q' is suspended from the pulley or drum k by a cord or rope, r, which passes upward through the platform D, over a pulley, s, then out over a pulley, t, in the end of the arm Q, and thence it passes around the drum k, to which its opposite end is secured.

When the drill-rod J is set, the operator, by means of the windlass C, raises the platform D to the desired height. The pawl m is engaged with the toothed wheel l, and the lower pawl p is engaged with the ratchet-wheel n, thus connecting the tubes, so that the whole will move together. The boring then proceeds until, by the lowering of the sliding platform D, the lower arm of the pawl p strikes a projection, u, on the guide-timber B. This releases the pawl from the ratchet n, and frees the lower tube, which gripes the drill-rod; but the continued rotation of the upper tube will cause the rope r to be wound upon the drum k, thus hoisting the auger, with its load of earth, to the surface without stopping the motion of the upper tube or shaft. When the auger is emptied of its earth or load, the pawl m is disengaged from the toothed wheel l, and the auger is allowed to lower again to its place on the lower end of the drill-rod. A brake applied to the rim of the drum serves to regulate the descending motion of the auger. The sliding platform is again raised, the drill-rod is lowered, and the same proceeding is again repeated.

To prevent the auger from moving upward on the drill-rod, where the pressure of the boring comes on its lower edge, I apply two gripers, w w, one on each side of the drill-rod, at the upper end of the auger, so that these gripers will bind against the rod, and prevent the auger from moving upward; but when the auger is raised by the upward draft upon the rope r, the first or initial pull releases these gripers and allows the auger to be raised, the drill-rod serving as a guide for it to move upon.

The earth-auger consists of a tube, L, which slides upon the drill-rod, and to the lower end of which is secured the spiral blades or cutters q. R is the sliding bucket, in which the earth is received. The cutters q form the bottom of this bucket. In order to permit a curbing-tube to be used I secure a supplemental hinged bit, d', to the point of each cutting-flange of the auger. This bit is longer than the ordinary cutting-bit, so as to cut a space outside of the bucket sufficient to allow the tube or curbing to pass down outside of the bucket R.

I thus provide a very convenient and simple machine for operating boring-augers, as it permits me to finish a cutting of a certain depth, and, without stopping the operation, raise the earth to the surface, the whole being performed automatically.

Having thus described my invention, what I claim, and desire to secure by Letters Patent, is—

1. The sliding platform D, with its short tube E, which is supported by the flange f, said tube having the conical threaded lower end split, as described, in combination with the nut g, for griping the drill-rod, substantially as above described.

2. The lower tube E, with its conical split threaded lower end and nut g, secured to the sliding platform D, in combination with the upper tube H or driving-shaft, when the two are arranged to be automatically connected and disconnected by means of the ratchet-wheel n, arm o, with its pawl p, and projection u, substantially as and for the purpose described.

3. The combination of an upper driving shaft or tube, H, with toothed wheel l and loose pulley k, with its pawl m, and having a ratchet-wheel, n, at its lower end, with a lower tube, E, having an automatically-operated pawl, by which the motion of the lower shaft can be arrested, while the upper shaft continues its rotation, substantially as and for the purpose described.

4. The combination of a lower tube, E, for holding the drill-rod, with an upper driving tube or shaft, H, for raising the auger, when the two are arranged to be automatically connected and disconnected without stopping the motion of the main driving tube or shaft, substantially as and for the purpose above described.

In witness whereof I hereunto set my hand and seal.

ELLERY M. HOAGLAND.

Witnesses:
OLWYN T. STACY,
GEO. H. STRONG.